O. I. STRAUB.
DETACHABLE RESILIENT TREAD FOR CONTINUOUS BELT TRACTORS.
APPLICATION FILED JUNE 9, 1919. RENEWED MAR. 27, 1920.
1,370,379.
Patented Mar. 1, 1921.
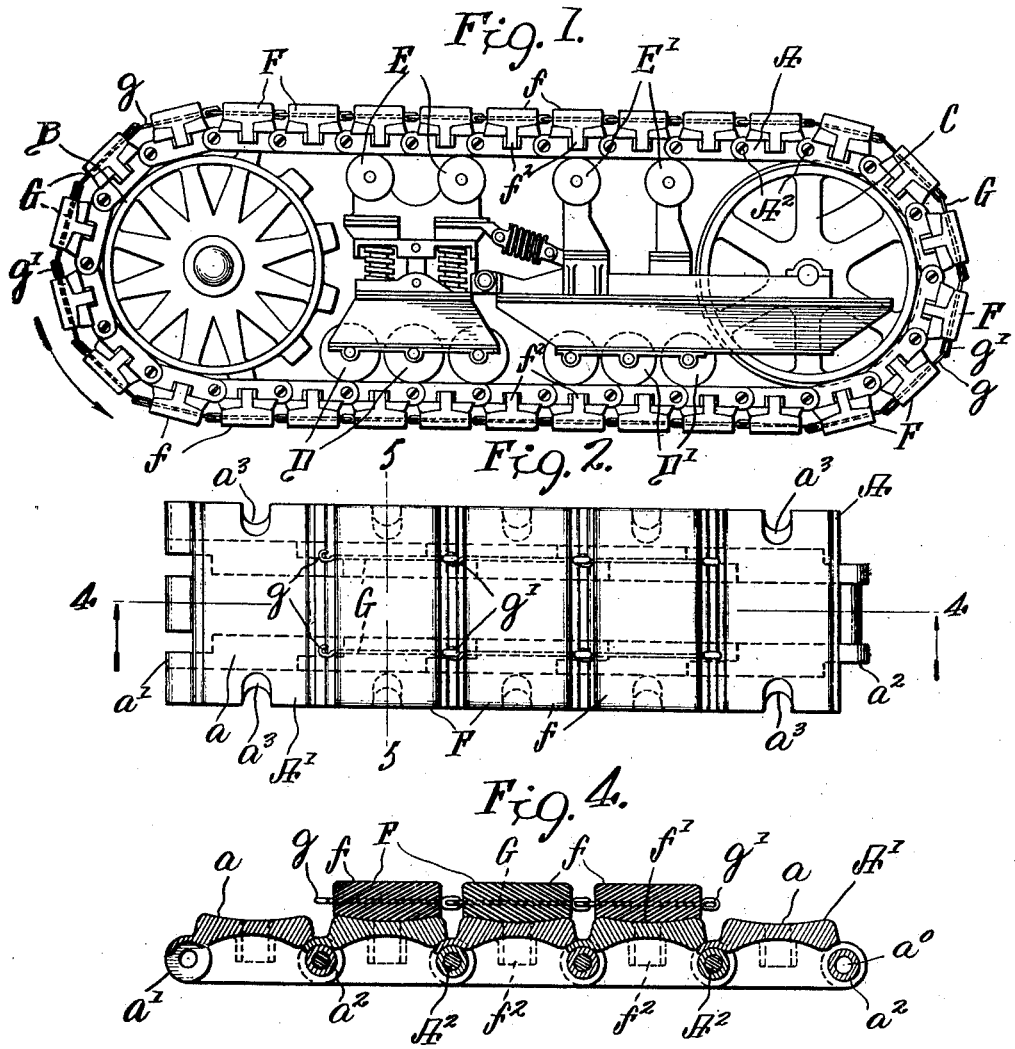
Inventor.
Oscar I. Straub.
by Wilkinson & Giusta,
Attorneys.

UNITED STATES PATENT OFFICE.

OSCAR I. STRAUB, OF PITTSBURGH, PENNSYLVANIA.

DETACHABLE RESILIENT TREAD FOR CONTINUOUS-BELT TRACTORS.

1,370,379.  Specification of Letters Patent.  Patented Mar. 1, 1921.

Application filed June 9, 1919, Serial No. 302,775. Renewed March 27, 1920. Serial No. 369,441.

*To all whom it may concern:*

Be it known that I, OSCAR I. STRAUB, a citizen of the United States, residing at Pittsburgh, in the county of Allegheny and State of Pennsylvania, have invented certain new and useful Improvements in Detachable Resilient Treads for Continuous-Belt Tractors; and I do hereby declare the following to be a full, clear, and exact description of the invention, such as will enable others skilled in the art to which it appertains to make and use the same.

My present invention relates to providing a resilient or elastic tread for continuous belt tractors intended to carry heavy weights, and it is intended to provide a detachable tread which may be applied to or removed from the tractor as desired; the purpose of such tread being not only to prevent excessive vibrations to the tractor and the parts carried thereby, but also to protect the roadbed over which the tractor is driven, and to enable the tractor to be driven at a higher rate of speed over said roadbed.

With continuous belt tractors as now constructed, the shoes contacting with the roadbed are ordinarily of steel or other hard metal, and these cause excessive vibrations with accompanying noise as the tractor proceeds over hard or stony ground, or cobble stones, asphalt or macadamized roads, or the like, not only to the inconvenience and discomfort of the parties driving the tractor, but also to the injury of the parts from excessive vibration.

Furthermore, these shoes biting into the face of the roadbed will scar or mutilate and seriously injure the same, and this injury is largely increased when the tractor is driven at any high rate of speed.

My present invention is intended to obviate in a large measure the vibration and concomitant noise aforesaid, and also to lessen the injury to the roadbed, and to permit the tractor to be driven at a higher rate of speed than is now practicable.

According to my invention I provide a detachable resilient tread in the form of an endless band composed of a series of resilient cushions, which band is adapted to slip over the outer face of the shoes and to be held thereon, as will be hereinafter described.

My invention will be more fully understood after reference to the accompanying drawings, in which like parts are indicated by similar reference symbols throughout the several views, and in which:—

Figure 1 is a side elevation of a continuous belt tractor of standard type fitted with my improved resilient tread.

Fig. 2 shows a plan view on a larger scale of a portion of the driving chain, the resilient pads being shown as applied to the three central shoes, and the end shoes being shown in plan.

Fig. 3 is a side elevation of two of the shoes, with the elastic pads applied, as shown in Fig. 2.

Fig. 4 shows a section along the line 4—4 of Fig. 2, and looking in the direction of the arrows; and Fig. 5 shows a section along the line 5—5 of Fig. 2.

A represents the driving chain of the tractor which is constructed in the usual way, and comprises a series of shoes A', each having the curved bearing face $a$ with the ears $a'$ and $a^2$ at each end thereof, which ears are perforated, as at $d°$, to receive the pins $A^2$ by means of which the links of the chain are connected together.

Each of the shoes is preferably indented at the edges $a^3$, which are provided so that grousers (not shown) may be applied to each of the shoes for traveling over rough ground.

This driving chain engages the sprocket wheel B, which is driven by any suitable motor, and the chain runs over the idler C. Rollers D and D' press downward on the chain, and are preferably so arranged that the downward pressure will be taken off the wheels B and C, and guide rollers E and E' are provided to support the weight of the chain between the wheels B and C.

So far I have only described in detail the standard construction of tractor well known in the United States Army and described in the *Handbook of the Artillery Tractor*, dated July 15, 1918.

My invention consists in applying to this or any similar standard form of tractor, without any change whatsoever in its construction, the resilient tread which will now be described.

This resilient tread consists of a band composed of a number of pads F of resilient material, preferably solid rubber, which pads are each preferably substantially flat on their treads, as at $f$, and curved on their opposite face, as at $f'$, to fit in the curved bearing face $a$ of the shoes A. These pads also are preferably provided with projecting ears $f^2$ adapted to engage in the grooves $a^3$ normally provided in the shoes A'.

In order to form a continuous chain of these pads, I provide a suitable connecting means, such as the rods G, embedded in each pad, and having at one end hooks $g$ to engage eyes $g'$ in the adjoining rod.

In Fig. 2 I have shown two rods embedded in each pad, but the number of rods in each pad may be increased or decreased as desired.

These rods G, together with the pads F, form an endless band when applied to the tractor, which may be quickly attached to the tractor or removed from the same when desired.

In order to apply the resilient band, disconnect adjacent links from each other and feed the pads *seriatim* to the tractor as the sprocket wheel B is rotated in the direction of the arrow. As soon as the free end of the resilient band is pressed beyond the wheel C, hold the various pads on the corresponding shoes until the free end of the band passes to the left of the sprocket wheel B, when the two ends of the band may be connected together.

In order to remove the resilient band from the tractor, uncouple the rods between adjacent pads to the left of the sprocket wheel B, and swing the free end of the band upward and rearward until it is clear of the wheel C. Now by turning the sprocket wheel B in the direction of the arrows, the tractor shoes will soon pass clear of the pads held beneath the same, and the resilient band will be released and may be rolled up into compact form or otherwise disposed of.

When it is not desired to have an endless chain of resilient pads, a pad may be bolted, or otherwise detachably joined, to each metal shoe, as for instance bolting the pad through its ears $f^2$ to the shoes through $a^3$. A similar method is used for the metal grousers that are used for biting deeper into the ground for steep grades.

While I prefer to use solid rubber to form the pads F, any other suitable yielding material may be used.

While I have shown, for purposes of illustration, the resilient tread band as applied to a standard Army tractor, it will be obvious that the pads F may be readily shaped to fit on other forms of tractor shoes, and I do not mean to limit the invention to any particular form of such shoes; one of the important features of the invention being that resilient bands may be so constructed as to be detachably connected to or removed from any of the well known types of continuous belt tractors, without requiring any changes whatever in the metallic parts of the tractor itself.

It will be obvious that various modifications might be made in the herein described apparatus, and in the construction, combination and arrangement of parts which could be used without departing from the spirit of my invention; and I do not mean to limit myself to such details except as particularly pointed out in the claims.

Having thus described my invention what I claim and desire to secure by Letters Patent of the United States is:—

1. A resilient tread for continuous belt tractors, comprising a band composed of a series of pads, each pad adapted to register with the corresponding shoe of the tractor, and a series of rods passing through said pads and connected together at their ends and forming with said pads an endless band, substantially as described.

2. A resilient tread for continuous belt tractors, comprising a band composed of a series of pads, each pad adapted to register with the corresponding shoe of the tractor, said pads being provided with inwardly projecting ears adapted to engage corresponding grooves in the sides of said shoes, with means for hinging the said pads together to form an endless band, substantially as described.

3. A resilient tread for continuous belt tractors, comprising a band composed of a series of pads, each pad adapted to register with the corresponding shoe of the tractor, said pads being provided with inwardly projecting ears adapted to engage corresponding grooves in the sides of said shoes, and a series of rods passing through said pads and connected together at their ends and forming with said pads an endless band, substantially as described.

4. The combination with a continuous belt tractor provided with a series of shoes hinged together and each shoe having a curved bearing face, of a series of pads, each pad adapted to register with the corresponding shoe of the tractor, and a series of rods passing through said pads and connected together at their ends and forming with said pads an endless band, substantially as described.

5. The combination with a continuous belt tractor provided with a series of shoes hinged together and each shoe having a curved bearing face, and grooves provided at each end of said bearing face, a series of pads, each pad adapted to register with the corresponding shoe of the tractor, said pads being provided with inwardly projecting ears adapted to engage the grooves in the sides of said shoes, with means for hinging the said pads together to form an endless band, substantially as described.

6. The combination with a continuous belt tractor provided with a series of shoes hinged together and each shoe having a curved bearing face, and grooves provided at each end of said bearing face, a series of pads, each pad adapted to register with the corresponding shoe of the tractor, said pads being provided with inwardly projecting ears adapted to engage the grooves in the sides of said shoes, and a series of rods passing through said pads and connected together at their ends and forming with said pads an endless band, substantially as described.

OSCAR I. STRAUB.